3,767,807
Patented Oct. 23, 1973

3,767,807
PROCESS FOR THE PRODUCTION OF LYOPHI-
LIZED PHARMACEUTICAL COMPOSITIONS
CONTAINING VITAMIN C
Pierre Blonde, Saint-Maur-des-Fosses, France, assignor to
Societe Anonyme dite: ORSYMONDE, Paris, France
No Drawing. Original application Apr. 14, 1970, Ser. No.
28,550, now abandoned. Divided and this application
Nov. 15, 1971, Ser. No. 198,996
Claims priority, application France, Apr. 15, 1969,
6911589
Int. Cl. A61k 15/12
U.S. Cl. 424—280                                 1 Claim

ABSTRACT OF THE DISCLOSURE

Lyophilized pharmaceutical compositions which dissolve rapidly in water while having improved mechanical strength and resistance to atmospheric moisture are made by lyophilizing vitamin C in admixture with lyophilization adjuvants such as glycine, gum arabic and a block copolymer.

---

This is a division of application Ser. No. 28,550, filed Apr. 14, 1970 now abandoned.

This invention relates to the production of pharmaceutical compositions.

It is well known that lyophilised products always have a fragile structure and are furthermore generally extremely hygroscopic. These two properties make them difficult to handle in an environment of normal humidity and make it necessary to use prefectly sealed packages for them.

This invention provides a process for the production of pharmaceutical compositions which have been dehydrated or desolvated by lyophilisation, and which are capable either of resuming their original form if solvent is provided, or of dissolving rapidly and completely in water. The new process furthermore makes it possible to lessen the two disadvantages described above by combining the medicament to be lyophilised with a lyophilisation adjuvant which imparts improved mechanical strength to the lyophilised product and slows down the moisture uptake.

The process of the present invention comprises mixing a medicament, in the presence of water with at least one lyophilisation adjuvant chosen from: (a) non-toxic colloids, polysaccharides and polymers of high molecular weight capable of yielding colloidal solutions, and (b) soluble, edible, crystallisable, extenders, and lyophilising the mixture obtained.

The lyophilisation adjuvants used in the new process must have such physical properties that their addition cannot interfere with the proper course of the lyophilization operation. Thus, they must not lower the freezing point of the material to be lyophilised to a level where melting would occur during the lyophilization. As these substances must be considered to be excipients for the pharmaceutical compositions, it is essential for them to have no effect on the medicament and to be physiologically innocuous.

Suitable materials are: (a) colloids, polysaccharides of high molecular weight, and high polymers which can yield colloidal solutions, especially gum arabic, alginates and pectinates, polyvinylpyrrolidone, polyethylene glycols, and carboxymethylcellulose; and (b) soluble, edible and crystallisable extenders, especially lactose, glycine, mannitol, sorbitol, glucose, and sucrose. Amongst the latter, lactose loses the one molecule of water it normally contains during the lyophilisation and can, as a result, play the role of a dehydrating agent in the lyophilised product.

These additional substances can be used individually or in mixtures. Harmoniously calculated proportions of these substances added to a solution of the material to be lyophilised make it possible to obtain a lyophilised product which is consistent, stable under normal ambient conditions, and entirely soluble and devoid of any toxicity (other than any toxicity of the medicament itself).

Variations in the amount of the lyophilization adjuvant make it possible to achieve any desired degree of hardness and solubility of the lyophilised product.

Medicaments of all kinds can be incorporated into mixtures to be lyophilized in accordance with the invention, e.g. water-soluble medicines, insoluble medicines dispersed as a colloidal suspension or emulsions, and also insoluble, undispersed medicines.

The lyophilised product obtained can be mechanically divided into pieces of well-defined shape and volume, which can be packed individually or in groups.

The pharmaceutical compositions obtained by the new process can be classified alongside effervescent, entirely soluble tablets while avoiding the use of large amounts of alkaline excipients, or alongside drinkable ampoules, having an advantage in cost price, or alongside any liquid form, having a definite advantage of lower volume and weight for a given dosage and showing great stability and excellent storage characteristics.

In the new process, the lyophilization adjuvant is added to the material to be lyophilised in the presence of a small amount of water, at ordinary temperature, and the resulting solution or paste is subsequently lyophilised in a manner known per se. If the mixture to be lyophilized is too liquid, because of the choice of the proportions of the constituents or for other reasons, and a separation takes place during mixing, the mixture is frozen with continuous stirring and when a pasty consistency has been achieved the mixture is spread on the previously cooled plates of the lyophilisation apparatus.

In one embodiment of the new process, the mixture to be lyophilised is converted into a foam and is stabilised with a block polymer of ethylene oxide, propylene oxide and ethylene glycol of molecular weight between 7500 and 8250, of the formula:

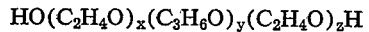

where x, y, and z are integers) in which the $(C_3H_6O)_y$ portion has a molecular weight of 1500 to 1800 and the $(C_2H_4O)_{x+z}$ portion represents 80–90% by weight of the polymer. This embodiment is particularly advantageous for the preparation of a lyophilised composition containing vitamin C. It is all the more unexpected because it is known that vitamin C cannot be lyophilised by itself but melts, regardless of the lyophilisation conditions, forming a varnish on the cooled surfaces of the lyophilization apparatus, without a continuous solution, thereby resisting lyophilisation.

Another embodiment of the invention relates to the preparation of effervescent pharmaceutical compositions. Effervescent pharmaceutical compositions have hitherto been prepared by a dry method, by combining a medicament in the anhydrous form with an effervescent mixture consisting of two anhydrous powders, one containing non-toxic organic acid such as e.g. citric acid, tartaric acid, or ascorbic acid and the other containing a weak mineral base particularly (carbonate or bicarbonate) such as an alkali metal or alkaline earth metal carbonate or bicarbonate, especially neutral sodium carbonate or sodium bicarbonate, calcium carbonate, or magnesium carbonate. The mixture thus obtained is shaped into tablets and stored with exclusion of moisture. When introduced into water, it dissolves, causing an effervescence due to copious evolution of carbon dioxide.

The process of this invention for making such compositions is a "wet" process, in which the constituents of the effervescent mixture are added to the mixture to be lyophilised, at a temperature below 0° C. sufficient to prevent any reaction between the constituents of the effervescent mixture, and the paste obtained is subsequently lyophilised.

Such a process has many advantages. It makes it possible to obtain lyophilised compositions which are completely soluble, because no insoluble excipients used as lubricants for tablet making (talc, stearate and the like) are employed. Desiccation by lyophilisation yields dryer products than those obtained by conventional drying processes without reaching temperatures which present the danger of altering any heat-labile active medicaments present in the composition.

The invention is illustrated by the following examples.

EXAMPLE 1

In this example, the manufacture of a medicine based on liver extract is described. The same process can also be applied to other medicaments.

The starting point is a commercially available liver extract for drinkable preparations, I=25, in the form of a soft extract containing 82% of solids.

Small lyophilisation containers, of parallelopiped shape and of size 5 cm. x 5 cm. x 3 cm., made of an aluminium foil of 50 microns thickness, are used. The surface which is in contact with air is thus 5×5=25 cm.$^2$. The small containers, numbers 1 to 5, are filled as follows:

No. 1—Solution:
  Liver extract, I=25 ........................... g— 4
  Water to 50 ml.
No. 2—Homogeneous paste obtained by triturating in a mortar:
  Glycine ...................................... g— 60
  Gum arabic in powder form ............... g— 1
  Water ........................................ ml— 15
No. 3—The same paste as 2, in which the glycine is replaced by lactose.
No. 4—The same paste as 2, but with 4 g. of liver extract dissolved in the 15 ml. of water.
No. 5—The same paste as 3, to which 4 g. of liver extract have been added.

Table I below summarises the composition of the contents of the small containers before lyophilisation and gives the net dry weights of the products obtained after lyophilisation.

TABLE I

| Small container No. | 1 | 2 | 3 | 4 | 5 |
|---|---|---|---|---|---|
| Liver extract, g | 4 | | | 4 | 4 |
| Glycine, g | | 60 | | 60 | |
| Lactose, g | | | 60 | | 60 |
| Gum arabic, g | | 1 | 1 | 1 | 1 |
| Water, ml | 50 | 15 | 15 | 15 | 15 |
| Weight after lyophilisation, g | 2.30 | 61 | 61 | 63.30 | 63.30 |

The temperature and pressure conditions used during the lyophilisation are given in Table II below.

After the lyophilisation, the small containers are weighed at intervals which during the first six hours are initially closely spaced, and the moisture uptakes are expressed, in Table III below, in milligrams of water taken up by the contents of the small containers, the adjacent column giving the percentage of water in the product.

The examination of the results shows that during the first hours the moisture uptake of the liver extract in lactose (No. 5) or in glycine (No. 4) is very slight relative to (that of) the lyophilised extract (No. 1), because the 2.30 g. of dry extract only take up 11 mg. after 4 hours in lactose (**) and 52 mg. after 4 hours in glycine (*), while the lyophilised extract (No. 1) had taken up 131 mg., representing 5.7% of water, as against 0.153% for the mixture of lactose+liver and 0.2% for the mixture of glycine+liver.

This shows that the very hygroscopic products are protected against a rapid moisture uptake, which allows them to be handled without taking many precautions and furthermore their low water content ensures that they store excellently. Furthermore, lactose has proved superior to glycine.

The measurements of the mechanical strength of the lyophilised products were carried out with a needle penetrometer usually employed for measuring the hardness of tablets. An increasing force is applied to the material over a constant surface area and the force required for breakage or for penetration of the needle is measured.

For the products No. 1 to No. 5 quoted above, the following hardnesses were found:

No. 1—too low, not measurable.
No. 2—5.5 to 7 kg.
No. 3—8 to 12 kg.
No. 4—2 to 3 kg.
No. 5—6 to 7 kg.

TABLE II.—TEMPERATURE AND PRESSURE CONDITIONS USED DURING THE LYOPHILISATION PROCESS

| Time in hours | 0 | 2 | 3 | 4 | 5 | 6 | 20 | 22 | 24 | 25 | 27 | 28 | 29 | 30 | 31 | 44 | 46 |
|---|---|---|---|---|---|---|---|---|---|---|---|---|---|---|---|---|---|
| Temperature of the material in °C | +20 | +5 | 0 | −4 | −24 | −30 | −24 | −22 | −15 | −1 | +22 | +25 | +27 | +28 | +30 | +44 | +37 |
| Pressure in mm. of Hg | 760 | 760 | 760 | 760 | 2×10$^{-1}$ | 2×10$^{-1}$ | 1.3×10$^{-1}$ | 1.3×10$^{-1}$ | 1.3×10$^{-1}$ | 1.3×10$^{-1}$ | 10$^{-1}$ | 10$^{-1}$ | 10$^{-1}$ | 10$^{-1}$ | 3×10$^{-3}$ | 3×10$^{-3}$ |

TABLE III.—WATER UPTAKE OF THE VARIOUS SAMPLES AS A FUNCTION OF TIME

| Weight of the lyophilised product | No. 1, Liver alone 2.30 g. | | No. 2, Glycine 61 g. | | No. 3, Lactose 61 g. | | No. 4, Glycine plus liver 63.3 g. | | No. 5, Lactose plus liver 63.3 g. | | (*) | (**) |
|---|---|---|---|---|---|---|---|---|---|---|---|---|
| 15 mins | 20 mg. | 0.87% | 13 mg. | 0.021% | 13 mg. | 0.021% | 20 mg. | 0.031% | 16 mg. | 0.025% | 7 mg. | 3 mg. |
| 30 mins | 34 mg. | 1.48% | 23 mg. | 0.038% | 23 mg. | 0.038% | 37 mg. | 0.058% | 27 mg. | 0.042% | 14 mg. | 4 mg. |
| 45 mins | 45 mg. | 1.96% | 30 mg. | 0.049% | 30 mg. | 0.049% | 51 mg. | 0.072% | 36 mg. | 0.057% | 21 mg. | 6 mg. |
| 60 mins | 55 mg. | 2.4% | 36 mg. | 0.059% | 37 mg. | 0.060% | 60 mg. | 0.09% | 44 mg. | 0.070% | 24 mg. | 7 mg. |
| 2 hrs | 94 mg. | 4.1% | 58 mg. | 0.095% | 59 mg. | 0.091% | 92 mg. | 0.145% | 68 mg. | 0.107% | 34 mg. | 9 mg. |
| 3 hrs | 112 mg. | 4.9% | 68 mg. | 0.112% | 71 mg. | 0.116% | 107 mg. | 0.17% | 82 mg. | 0.129% | 39 mg. | 11 mg. |
| 4 hrs 15 mins | 131 mg. | 5.7% | 78 mg. | 0.128% | 86 mg. | 0.14% | 130 mg. | 0.20% | 97 mg. | 0.153% | 52 mg. | 11 ms. |
| 5 hrs 30 mins | 153 mg. | 6.65% | 88 mg. | 0.144% | 100 mg. | 0.164% | 152 mg. | 0.24% | 116 mg. | 1.183% | 64 mg. | 16 mg. |
| 6 hrs 15 mins | 164 mg. | 7.1% | 92 mg. | 0.151% | 102 mg. | 0.167% | 165 mg. | 0.26% | 126 mg. | 0.20% | 73 mg. | 24 mg. |
| 24 hrs | 249 mg. | 10.9% | 108 mg. | 0.178% | 154 mg. | 0.252 | 285 mg. | 0.45% | 235 mg. | 0.37% | 177 mg. | 81 mg. |
| 72 hrs | 317 mg. | 13.8% | 114 mg. | 0.188% | 165 mg. | 0.270% | 387 mg. | 0.61% | 334 mg. | 0.52% | 273 mg. | 169 mg. |

\* Water uptake by the liver extract in the glycine (No. 4–No. 2)
\*\* Water uptake by the liver extract in the lactose (No. 5–No. 3)

EXAMPLE 2

The process described in Example 1 is repeated, but replacing the gum arabic by each of the following excipients.

The experiments were carried out adding the amount of polymer indicated below to 250 g. of lactose or of glycine:

|  | G. |
|---|---|
| Polyethylene glycol M.W.=20,000 | 15 |
| Polyethylene glycol M.W.=6,000 | 15 |
| Polyvinylpyrrolidone | 10 |
| Carboxymethylcellulose | 2.5 |
| Sodium alginate | 1.25 |
| Guaranate AC 110 | 1.25 |

All these experiments proved satisfactory and gave results of the same order as those mentioned in Example 1 above.

EXAMPLE 3

The process of Example 1 is repeated, but replacing the lactose and the glycine by other substances such as: glucose, sucrose and mannitol, either by themselves or mixed with the two preceding substances. The experiments carried out with or without gum arabic gave good results. Table IV below gives in grams the quantities used in the various experiments.

TABLE IV

| Experiment | 1 | 2 | 3 | 4 | 5 |
|---|---|---|---|---|---|
| Glycine | 100 | | | | |
| Mannitol | | 250 | | 300 | |
| Sucrose | | | 250 | | |
| Glucose | 250 | | | | 250 |
| Gum arabic | 15 | 15 | 15 | | |

EXAMPLE 4

This example describes the preparation of a medicine based on vitamin C.

Vitamin C cannot be lyophilised alone since it melts regardless of the lyophilisation conditions, forming a varnish on the lyophilisation surfaces. The solution of this invention is creating a foam in the mixture which results in the formation of small channels, which permit lyophilisation, and introducing the vitamin C into the mixture at the last moment so that virtually it does not dissolve.

Experiments carried out on the following mixtures: (1) lactose+glycine+gum arabic; (2) glycine+gum arabic; did not allow a dose of 0.05 g. of vitamin C to be exceeded, regardless of the technique employed to cause foaming.

However, on using the following mixture: glycine+gum arabic+RC102 (Pluronic F68) in which the RC102 (a block polymer of ethylene oxide, propylene oxide and ethylene glycol) serves as a foam stabiliser, it proved possible successfully to lyophilise doses of vitamin C of 0.100 g., 0.250 g. and 0.500 g.

TABLE V.—FORMULATIONS PRODUCED

| Vitamin C, g | 0.100 | 0.250 | 0.500 |
|---|---|---|---|
| Glycine, g | 1.100 | 1.100 | 1.100 |
| Gum arabic, g | 0.06 | 0.06 | 0.06 |
| RC 102 platelets, g | 0.05 | 0.05 | 0.05 |
| De-ionized water, ml | 0.3 | 0.3 | 0.3 |
| For one piece of approximate weight, g | 1.31 | 1.46 | 1.71 |

EXAMPLE 5

This example describes the preparation, by lyophilisation, of a medicine based on arginine acid aspartate in an effervescent form. The following two mixtures A and B are separately prepared in a mortar:

Mixture A:
- Sodium bicarbonate _____g__ 8
- Arginine base _____g__ 434
- Sucrose _____g__ 6.66
- Lactose _____g__ 6
- Water _____ml__ 1.5

Mixture B:
- Citric acid _____g__ 5
- Aspartic acid _____g__ 5.66
- Sucrose _____g__ 7.34
- Lactose _____g__ 7
- Water _____ml__ 1.5

The two mixtures A and B are separately cooled until they reach a temperature of −4° C. or below. A is then rapidly mixed with B while continuing cooling. The paste is spread as an approximately 1 cm. thick layer on metal plates and frozen at −20° C., and the material is lyophilised. The lyophilised product is then cut into pieces each weighing 5 g. Each piece contains 1 g. of arginine acid aspartate and dissolves very rapidly in water.

I claim:

1. Process for the preparation of a composition of vitamin C which comprises lyophilizing a mixture of 0.1 to 0.5 part by weight of vitamin C, 0.3 part of water, 1.1 part of glycine, 0.06 part of gum arabic and 0.05 part of a block copolymer of ethylene oxide, propylene oxide and ethylene glycol having a molecular weight of 7500 to 8250 and the formula:

$$HO(C_2H_4O)_x(C_3H_6O)_y(C_2H_4O)_zH$$

in which $x$, $y$ and $z$ are integers, the $(C_3H_6O)_y$ portion has a molecular weight of from 1500 to 1800, and the ethylene oxide residues represent 80 to 90% by weight of the polymer.

References Cited

UNITED STATES PATENTS 3,105,792  10/1963  White 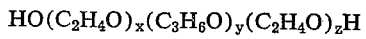 424—280

OTHER REFERENCES

The Merck Index, 8th ed. (1968) p. 846.

SAM ROSEN, Primary Examiner